(12) United States Patent
Locker

(10) Patent No.: US 7,606,983 B2
(45) Date of Patent: Oct. 20, 2009

(54) SEQUENTIAL ORDERING OF TRANSACTIONS IN DIGITAL SYSTEMS WITH MULTIPLE REQUESTORS

(75) Inventor: Kevin Locker, Scottsdale, AZ (US)

(73) Assignee: NXP B.V., Eindhoven (NL)

( * ) Notice: Subject to any disclaimer, the term of this patent is extended or adjusted under 35 U.S.C. 154(b) by 1136 days.

(21) Appl. No.: 10/873,894

(22) Filed: Jun. 21, 2004

(65) Prior Publication Data

US 2006/0047773 A1 Mar. 2, 2006

(51) Int. Cl.
*G06F 13/00* (2006.01)
(52) U.S. Cl. .................... 711/151; 711/158; 711/163
(58) Field of Classification Search .............. 711/151, 711/158, 163
See application file for complete search history.

(56) References Cited

U.S. PATENT DOCUMENTS

| | | | | |
|---|---|---|---|---|
| 5,493,668 A | * | 2/1996 | Elko et al. ............... | 711/130 |
| 5,913,059 A | * | 6/1999 | Torii ....................... | 718/104 |
| 6,058,466 A | * | 5/2000 | Panwar et al. ............ | 712/15 |
| 6,073,159 A | * | 6/2000 | Emer et al. ............... | 718/103 |
| 6,438,661 B1 | * | 8/2002 | Beardsley et al. ........ | 711/144 |
| 7,149,829 B2 | * | 12/2006 | Weber et al. .............. | 710/243 |
| 2004/0148475 A1 | * | 7/2004 | Ogasawara ............... | 711/151 |
| 2005/0204119 A1 | * | 9/2005 | Saha ........................ | 712/235 |

* cited by examiner

*Primary Examiner*—Reba I Elmore

(57) ABSTRACT

A digital system with an improved transaction ordering policy is disclosed. Individual occurrences of requests for access to common system resources specify whether or not the request is ordered. In some embodiments, the invention includes a memory that holds data, a controller, and at least two processors that generate requests to access the memory data. Each access request includes an indication of whether or not this request is to be performed in a sequential order among other access requests and, if so, an indication of the order. The controller receives the access requests from each processor, determines a performance order for the requests, and provides the access requests to the memory in the performance order. The performance order conforms to the specified order when the access requests so indicate.

17 Claims, 5 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| REQUESTOR NO. 1 110A | SEND: READ REQUEST 220 | | | | | RECEIVE: READ RESPONSE 222A | RECEIVE: READ RESPONSE 222B | RECEIVE: READ RESPONSE 222C | RECEIVE: READ RESPONSE 222D | SEND: NOTICE TO REQ. #2 224 | | | | | | REQUEST: WRITE STATUS RESPONSE 228 |
| REQUESTOR NO. 2 110B | | | | | | | | | | RECEIVE: NOTICE FROM REQ. #1 224 | SEND: WRITE REQUEST 226 | | | | | |
| RESPONDER 140 | | | RECEIVE: READ REQUEST 220 | SEND: READ RESPONSE 222A | SEND: READ RESPONSE 222B | SEND: READ RESPONSE 222C | SEND: READ RESPONSE 222D | | | | | | RECEIVE: WRITE REQUEST 226 | SEND: WRITE STATUS RESPONSE 228 | | |
| BUS CYCLE NO. 210 → | 1 | 2 | 3 | 4 | 5 | 6 | 7 | 8 | 9 | 10 | 11 | 12 | 13 | 14 | 15 | 16 |

FIG. 2

Prior Art

SEQUENTIAL ORDERING OF TRANSACTIONS IN DIGITAL SYSTEMS WITH MULTIPLE REQUESTORS

FIELD OF THE INVENTION

The invention relates generally to methods and apparatuses for designing digital systems. More particularly, the invention relates to a transaction ordering policy for digital systems in which multiple functional modules make requests of shared resources.

BACKGROUND ART

Modern society and technology are increasingly based on digital electronic devices. Personal computers (PCs), digital versatile disk (DVD) players and recorders, and set top boxes for digital cable systems are among the numerous examples of such devices. Many digital electronic devices include multiple autonomous or semi-autonomous functional modules, such as processors, that share access to common resources, such as memory.

FIG. 1 shows the functional modules and their interconnections within one example of a digital electronic device that has multiple functional modules, each of which independently access a shared or common system resource. Digital system 100 includes two requesters 110, which are functional modules that make requests on responder 140 which includes main memory 144. System 100 also includes bus network 130 that conveys requests 120 from the requesters to the responder, and conveys responses 125 from the responder back to the corresponding requestor.

Requestor 110A is a programmed microprocessor and requestor 110B is a special-purpose processor, specifically a video encoder/decoder. Requestors 110 generate requests 120 for main memory 144, which is a common resource within system 100. The requestors provide these requests to bus network 130. Requestors 110 are able to communicate among each other via interrupts 150, as well as by passing information back and forth by encoding it as data that is held in main memory 144.

Bus network 130 includes one or more buses that convey information as electronic signals among devices. Requests 120, which include data and addresses, and responses 125 which include data, addresses and status information, are transferred between two functional modules via bus network 130. The bus network may be a single bus, or may include relay circuitry that transfers information across multiple buses.

Bus network 130 receives a request 120 from either requester 110A or requester 110B, and then delivers the request to responder 140. Bus network also receives responses 125 from requester 140 and provides the responses to either requestor 110A or 110B, according to addressing information contained within each response.

Responder 140 includes main memory 144 and memory controller 142. Memory controller 142 receives access requests from each of requestors 110 via bus network 130, resolves any contentions that occur when more than one access request is active at the same time, determines an order in which the access requests are to be performed, and presents one access request at a time to main memory 144.

Main memory 144 is a random access memory (RAM). Each access request includes the address or address range within the RAM that is to be read or written. Write access requests also include the data that is to be written. When main memory 144 performs a write access request, memory controller 142 generates a write status response and provides it to bus network 130 as an occurrence of response 125 that is addressed to the requestor that generated the write request. When main memory 144 performs a read access request, the memory recalls the data stored at the specified address or addresses and provides that data to controller 142, which in turn includes the data in one or more occurrences of response 125, each of which is addressed to the requestor that generated the read request.

For multimedia systems, as well as for other digital devices where data communication can be a performance bottleneck, the features provided by the bus network that links the requestors to the responders can have a substantial impact on overall system performance. One example of a bus network design that advantageously increases system performance is a bus that includes multiple parallel channels that support simultaneous transfer of request, response, data, address and status data, or of some combination thereof.

Such a multi-channel bus must be designed to operate according to a bus network protocol. Each requestor in such a system must be designed to operate according to the protocol, as must each controller within a responder. Most bus network protocols rely on a transaction ordering policy. Typically a transaction ordering policy defines:

The order in which multiple access requests are performed; and

How an access request is synchronized or connected together with the response resulting from that request.

An access request and its associated response together comprise a complete transaction, but they occur at separate times, that is, during separate bus cycles. The different channels within a bus may at the same time carry both the response to an earlier access request and a new access request.

A first example of a transaction ordering policy is a global first-in-first-out (FIFO) policy. Under this policy, each transaction is completed, and the completion is indicated via a response being generated from the responder, before the responder performs any other access request. This policy provides the necessary definition of the performance order of multiple access requests. This policy also defines an advantageously simple mechanism to associate requests with the corresponding responses.

A second example of a transaction ordering policy is a first-in-first-out (FIFO) policy among transactions from the same requester along with a free-flowing, unconstrained order among transactions from different requesters. This ordering policy requires that a requestor identifier (ID) signal be associated with channel within each bus. Access requests with the same requestor ID value are performed first in first out, while transactions with different IDs are unordered and may be performed in any order. The value of the requestor ID is provided by the responder in the response, and is used by the requesters to associate the request with its corresponding response.

A third example of a transaction ordering policy is one that places no constraints on when transactions are performed, either within transactions from a single requestor or among transactions from multiple requesters.

FIFO ordering can negatively impact performance. This is especially the case in systems characterized by multiple data streams that have large differences in the data rates of the streams. This situation is common in multimedia systems, where video data streams have data rates that are substantially higher than high-fidelity audio data streams, which in turn have substantially higher data rates than conversational audio data streams. In a multimedia system, operating under either the first or the second example of a FIFO transaction ordering policy, higher rate data streams can easily become blocked waiting for lower rate data streams to complete transactions.

On the other hand, unordered transactions can cause errors to occur in those transactions where correct operation of the system requires access requests to be performed in a particular order. To eliminate these potential errors, the requestors using unordered transactions must impose transaction ordering in those situations in which performance order is important.

FIG. 2 illustrates how an example of two transactions flows through bus network 130. Information flow 200 is illustrated as a matrix, in which each row represents a functional module within the system. Each column of the matrix represents a bus cycle. During any particular bus cycle, at most one value is transferred on each channel of each bus within the bus network. Each cell of the matrix contains a description of the information that flows during the corresponding bus cycle to the corresponding functional module from the bus network, or to the bus network from that functional module.

In this example, responder 140 does not order transactions among different requestors. To compensate for this, when ordering is important the two requesters must operate together to impose the proper order of performing the transactions. Thus, information flow 200 applies both to systems that follow either the second example transaction ordering policy in which transactions from the same requestor are given a FIFO order, and to systems that follow the third example transaction ordering policy in which the bus network imposes no order on any transactions.

Information flow 200 shows the information going into and out of the bus network during a period of 16 bus cycles. This period starts with when the access request for the first transaction is generated and ends with when the response to the second transaction is received.

The first transaction is a read request from requestor 110A, the second transaction is a write request from requestor 110B. This example assumes that proper system operation occurs only when the data read from the responder is the value of the data prior to the write, which case occurs when the requestors are using system memory to pass information from requestor 110B to requestor 110A.

In bus cycle 1, requestor 110A generates read access request 220 and provides it to the bus network. The bus network may be pipelined to allow shorter bus cycles, may include multiple buses with relay circuitry among the buses, or may contain a FIFO register to interface between buses operating at different bus cycle rates. In such bus networks, information requires some number of clock cycles to move through the bus network. In the example of FIG. 2, the latency of the bus network is assumed to be two bus cycles. Thus after two cycles, i.e., in cycle 3, responder 140 receives read request 220.

In the example of FIG. 2, responder 140 is assumed to not be busy with any other transactions and to be able, when not busy, to respond to a request in the bus cycle after the request is received. Thus in cycle 4, the responder generates response to read request 222A and provides it to the bus network. In the example of FIG. 2, the read request is assumed to be for a short block of contiguous data that requires 4 bus cycles to be transferred. Thus in cycles 5, 6 and 7, the responder generates responses to read request 222B, 222C and 222D. Each response 222 includes providing to the bus network a portion of the data being held in responder 140 that was requested by requestor 110A.

Responses to read request 222 are received by requestor 110A during cycles 6 through 9. Because the bus network of this example imposes no ordering on access requests from different requesters, the responsibility of ensuring that the first transaction is performed prior to the second transaction falls on the requesters. To ensure this transaction order, in bus cycle 10 requestor 110A generates notification 224 that the read transaction is complete and provides the notification to requestor 110B.

In the example of FIG. 2, it is assumed that requestor 110A is capable of generating notification 224 in the bus cycle immediately after receiving the final read response 222D, that requester 110B is able to receive the notification in the same bus cycle without any latency, and that requestor 110B is able to generate write request 226 without any latency in the bus cycle immediately after receiving notification.

In cycle 13, responder 140 receives write request 226 from the bus network. In cycle 14, responder 140 performs the write request, generates write status response 228, and provides it to the bus network. In cycle 16, requester 110B receives write status response 228. Thus, the two example transactions of information flow 200 of FIG. 2 are completed in 16 bus cycles.

The assumptions used in information flow 200 may be optimistic. There could easily be a latency of six to twelve cycles (compared to two cycles in flow 200) between the bus cycle in which the final read response 222D is received (cycle 9 in flow 200) and the bus cycle in which write request 226 is generated (cycle 11 in flow 200). There could easily be a latency of six to twelve cycles (compared to two cycles in flow 200) for requests and responses to pass through bus network 130.

Thus, the performance of digital system 100 for the transaction example can be summarized in Table 1, which gives the bus cycles required for bus latencies of two, six and twelve cycles and for inter-requestor latencies of two, six and twelve cycles.

TABLE 1

| Bus cycles required for transaction example | Bus Latency = 2 | Bus Latency = 6 | Bus Latency = 12 |
|---|---|---|---|
| Inter-requestor Latency = 2 | 16 | 32 | 56 |
| Inter-requestor Latency = 6 | 20 | 36 | 60 |
| Inter-requestor Latency = 12 | 26 | 42 | 66 |

SUMMARY OF THE INVENTION

Thus there is a need for a transaction ordering policy that both reduces the performance penalty due to blocking under a FIFO policy and reduces the performance penalty due to the requestors being responsible for ordering transactions under a policy that does not constrain transactions from different requesters.

The object of the invention is to provide an improved transaction ordering policy in which individual occurrences of access requests can specify whether or not the associated transaction is to be performed in order. Some embodiments of the invention advantageously reduce unnecessary blocking of transactions involving resources shared among requesters. Other embodiments of the invention advantageously simplify what requestors must do to ensure that access requests are performed in the proper order.

In some embodiments, the invention provides a system for processing information, including a memory that holds data, a controller, and at least two processors that perform operations and that generate access requests when one of the operations involves accessing the data. Each access request includes an indication of whether or not this request is to be performed in a sequential order among other access requests and, if so, an indication of the order. The controller receives the access requests from each processor, determines a performance order for the requests, and provides the access requests to the memory in the order in which the requests are to be performed. The performance order conforms to the specified order when the access requests so indicate.

BRIEF DESCRIPTION OF THE DRAWING

Objects, features and advantages of the invention will become apparent from the descriptions and discussions herein, when read in conjunction with the drawings. Technologies related to the invention, example embodiments of the invention, and example uses of the invention are illustrated in the drawings, which are as follows:

FIG. 2 is an information flow/cycle timing diagram for an example in which two ordered transactions are performed in a system that does not order transactions among different requesters.

BEST MODE FOR CARRYING OUT THE INVENTION

The descriptions, discussions and figures herein illustrate technologies related to the invention, show examples of the invention and give examples of using the invention. Known methods, procedures, systems, circuits, or elements may be illustrated and described without giving details so as to avoid obscuring the principles of the invention. On the other hand, details of specific embodiments of the invention are presented, even though such details may not apply to other embodiments of the invention.

Some descriptions and discussions herein use abstract or general terms including but not limited to: operation, send, receive, generate, equal, less than, hold, clock, control, assert, true or false. Those skilled in the art use such terms as a convenient nomenclature for components, data or operations within a computer, an electronic device, or an electromechanical system.

Such components, data and operations are represented by physical properties of actual objects including but not limited to electronic voltage, magnetic field, or optical reflectivity. For example, "asserted" or "true" may refer to an electronic signal that is around 3 volts and "not asserted" or "false" may refer to a signal around 0.3 volts, or vice versa. Similarly, perceptive or mental terms including but not limited to determine or indicate may also refer to such components, data, operations or manipulations of physical properties.

Figure 3:
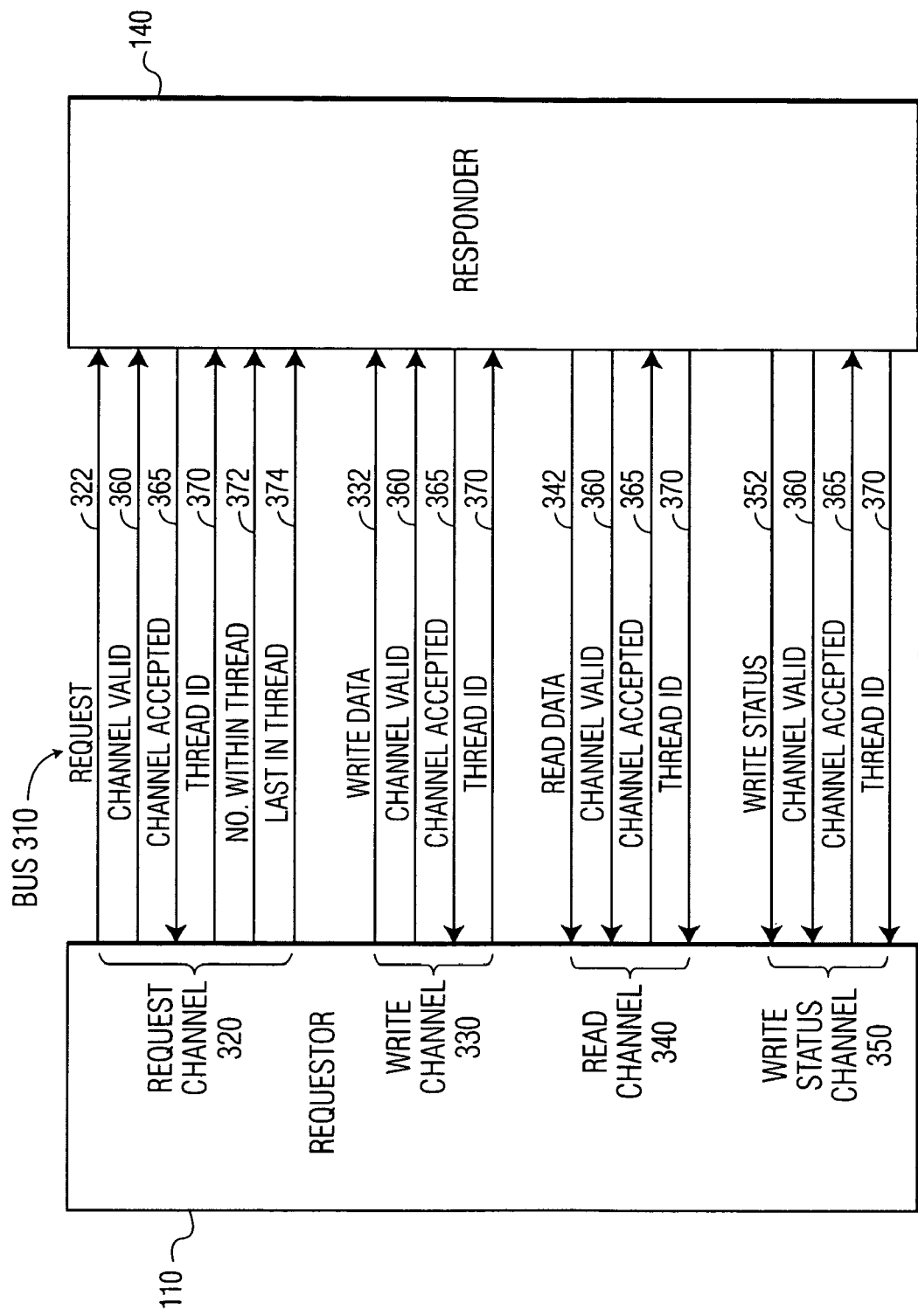
FIG. 3 is a bus signal diagram for an exemplary bus according to the invention.

FIG. 3 illustrates the electronic signals that are included within an exemplary bus according to the invention. FIG. 3 shows requester 110 and responder 140, which are coupled to each other by bus 310. Bus 310 includes request channel 320, write channel 330, read channel 340, and write status channel 350.

Request channel 320 conveys a request from the requestor to the responder. The request channel includes request signals 322, channel valid signal 360, channel accepted signal 365, thread ID signals 370, sequence number within thread signals 372, and last in thread signal 374.

Request signals 322 indicate the type of request that is being made. For example, if the responder includes a memory such as a RAM or a content addressable memory (CAM), then the responder may support one or more of the following request types:

Read requests, in response to which data held in the memory is provided;

Write requests, in response to which to which data provided in the request is written into the memory and held there;

Move requests, in response to which data held in the memory is transferred from one location within the memory to another; or Lookup requests, in response to which the data held in a content addressable memory is searched to find an entry whose content matches the key provided in the lookup request.

The transaction-ordering signals include thread ID signals 370, sequence number signals 372 and last in thread signal 374. The transaction ordering signals are the mechanism by which requestor 110 indicates to responder 140 whether each occurrence of a request is to be performed in an ordered manner or in an unordered manner, and, if ordered, what the ordering constraint on that request is. The semantics of, and even the presence of each transaction-ordering signal, may vary among various embodiments of the invention.

Any one or any two of thread ID signals 370, sequence number signals 372 or last-in-thread signal 374 may be omitted.

If thread ID signal 370 is the only transaction-ordering signal used, then a value of zero indicates an unordered transaction. In some embodiments, multiple requests having the same thread ID value may be performed in any order, as long as they are performed subsequent to transactions having a lower (or higher) thread ID value. In other embodiments, multiple requests having the same thread ID value are to be performed in the order in which they are generated, and there are no constraints among transactions having different thread IDs.

In yet other embodiments, thread ID signal 370 may be used in conjunction with sequence-number signal 372. Requests having different thread ID values have no ordering constraint among them. Requests having the same thread ID values are to be performed in the increasing (or decreasing) numerical order of the sequence numbers.

In still other embodiments, thread ID signal 370 may be used in conjunction with last-in-thread signal 374. Last-in-thread signal 374 may be required to fully specify the order of the transactions within a thread. Alternatively, last-in-thread signal 374 may be redundant to the ordering information present in the other transaction-ordering signals but usefully interpreted by responder 140 as being an indication that the responder need not wait for any more transactions within this thread to occur before determining the performance order of the transactions within this thread.

If sequence-number signal 372 is the only transaction-ordering signal used, then a value of zero is used indicate an unordered transaction. Requests with non-zero sequence numbers are performed subsequent to transactions having a sequence number that is lower in value. In some embodiments, multiple requests having the same sequence number value are illegal. In other embodiments, multiple requests having the same sequence number value may be performed in any order. In other embodiments, multiple requests having the same sequence number value are to be performed in the order in which they are generated.

In yet other embodiments, sequence number signal 372 may be used in conjunction with last-in-thread signal 374, in a manner similar to the use of last-in-thread signal 374 in conjunction with thread ID signal 370.

If last-in-thread signal 374 is the only transaction-ordering signal used, then it is asserted to indicate the last request in an ordered sequence. The ordered sequence includes the request that has last-in-thread signal 374 asserted as well as all prior requests in which last-in-thread signal 374 is not asserted back until a previous request that has the last-in-transaction signal asserted. Also, last-in-thread signal 374 may be asserted in two or more requests that occur consecutively to indicate one or more unordered transactions, that is, that each such thread contains only the transaction that is last in that one-transaction thread.

Other embodiments of the invention may assign different semantics to the three transaction-ordering signals described herein, or may add other transaction ordering signals, provided that the signals and semantics defined allow occurrences of access requests to indicate whether or not they are ordered, and if ordered, what ordering constraints apply to that access request occurrence.

Channel-valid signal 360 and channel accepted signal 365 are included in each channel within bus 310. The channel-valid signal is asserted for each bus cycle in which the other signals within that channel have values that indicate a request or a response. The channel-valid signal is not asserted in bus cycles in which that particular channel of the bus is idle.

Channel accepted signal 365 is generated by the responder or the requester, whichever device receives the other signals in that channel. The channel accepted signal is asserted when the receiving device successfully receives the information on the other signals in the channel. The sending device holds the information on the other signals in the channel until the channel accepted signal is asserted.

Write channel 330 conveys, on write data signals 332, data to be written from the requester to the responder. The write channel also includes write data signals 332, channel valid signal 360, channel accepted signal 365, and thread ID signals 370.

Read channel 340 conveys, on read data signals 342, data that has been read from the responder to the requester. The read channel also includes channel valid signal 360, channel accepted signal 365, and thread ID signals 370.

Write status channel 350 conveys, on write status signals 352, status information generated as a result of performing requests to write data from the responder to the requester. Such status information typically includes either a flag indicating a successful write or an error code. The write status channel also includes channel valid signal 360, channel accepted signal 365, and thread ID signals 370.

Responder 140 may include a memory circuit, device or system, including but not limited to a local memory, an embedded memory, an interface to a remote memory, a main memory, a video memory, a frame buffer memory, a communication buffer, a double data rate (DDR) memory, a RAM, a static random access memory (SRAM), a content addressable memory (CAM), or the like.

In some embodiments of the invention, responder 140 may have significant data processing capability in addition to data storage capability. In various embodiments of the invention, any circuit, device or system may be used as responder 140 provided that the responder is able to hold data and to respond to requests involving the data being held.

Figure 4:
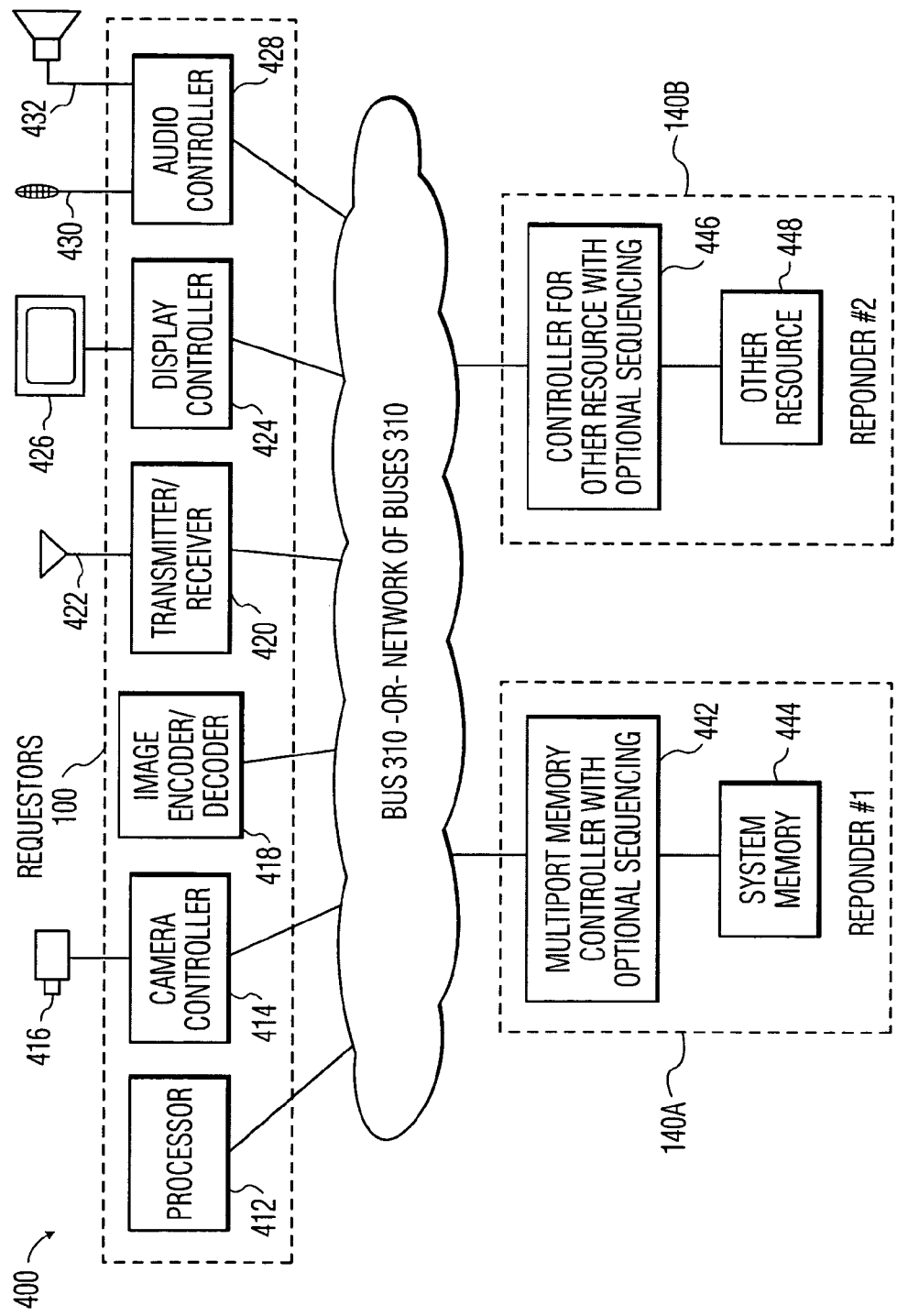
FIG. 4 is a functional block diagram of an exemplary digital multimedia system according to the invention.

FIG. 4 shows the functional modules and their interconnections within an exemplary digital system according to the invention. In multimedia system 400, multiple functional modules generate access requests of multiple shared resources, where each access request includes an indication of whether or not the corresponding transaction is to be ordered, and, if so an indication of the ordering to be used. Multimedia system 400 includes requestors 110, responders 140, and either bus 310 or a network of busses 310 to couple the requestors to the responders.

Figure 1:
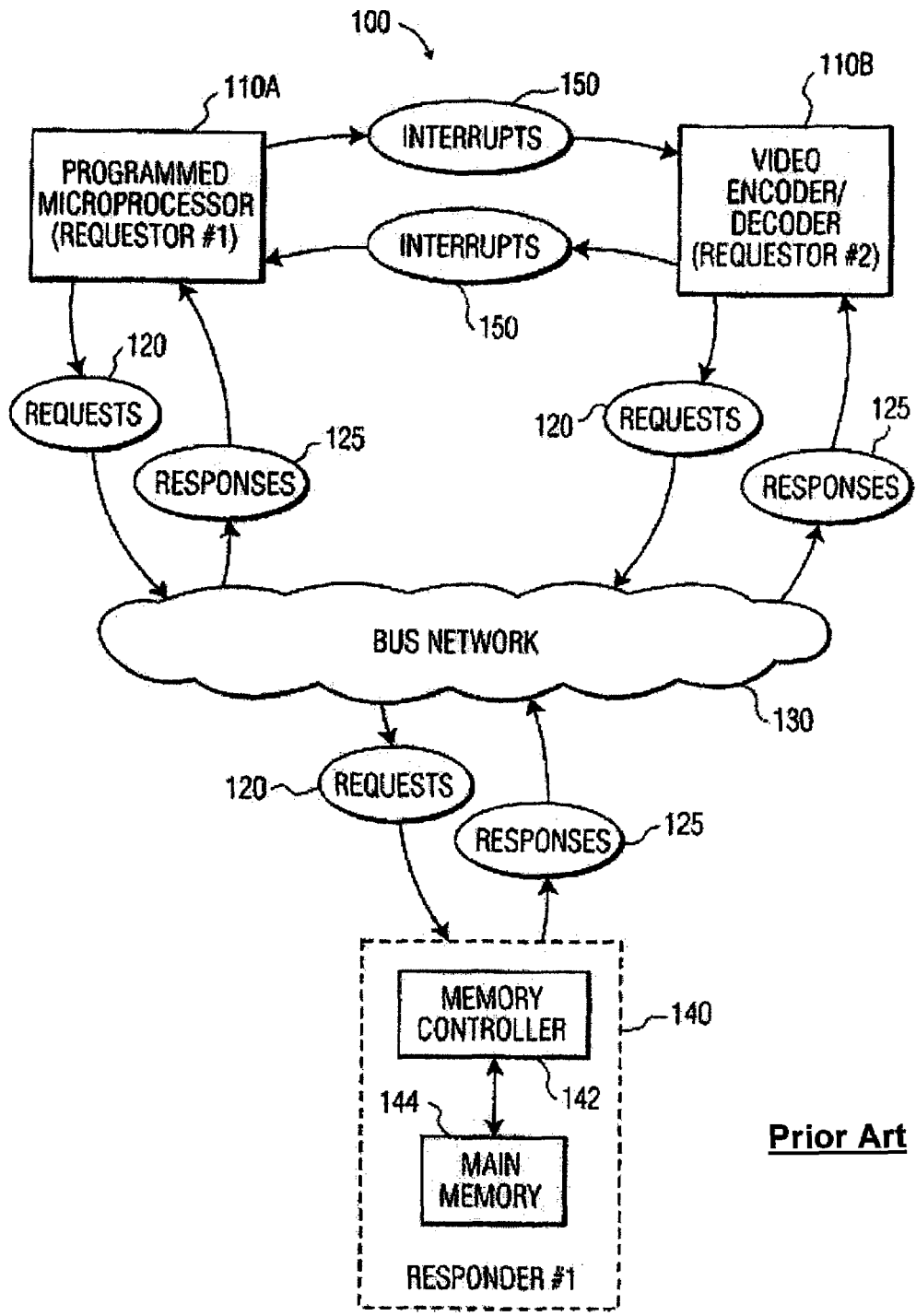
FIG. 1 is a functional block diagram of one example of a digital system in which multiple functional modules access shared main memory.

Multimedia system 400 is only one example of a system that embodies the invention; various embodiments of the invention may be used with various configurations of requesters, responders and buses. Except as described below, the design of, alternatives for, and operation of the elements of multimedia system 400 are as described above with respect to the corresponding elements of FIGS. 1 and 3.

Multimedia system 400 includes a number of requesters 110, that is, functional modules that make requests on one or more common system resources. These requestors are processor 412, camera controller 414, image encoder/decoder 418, transmitter/receiver 420, display controller 424 and audio controller 428.

The bus network of system 400 includes one or more buses 310. The bus network may include relay circuitry to transfer information across multiple buses.

In multimedia system 400, the shared resources are system memory 444 and other resource 448. First responder 140A includes system memory 444 and controller 442. Controller 442 is a multiport memory controller that is capable of ordering transactions as specified in each request, according to an embodiment of the invention.

Second responder 140B includes other resource 448 and associated controller 446. Controller 446 is a multiport controller for other resource 448 that is capable of ordering transactions as specified in each request, according to an embodiment of the invention.

Processor 412 is a programmable processor, such as a microprocessor, that is coupled to system memory 444 via multi-port memory controller 442. Processor 412 can operate on the data in the system memory, and can control the other requestors in multimedia system 400. Processor 412 operates on the system memory data by means of issuing read and write requests to multiport memory controller 442, and receiving back from the controller a response that corresponds to each access request. Similarly, processor 412 can operate on the information held in other resource 448 by means of issuing appropriate requests to controller 446.

Camera controller 414 is coupled to camera 416, from which it receives digital video data or digital image data. The camera controller is also coupled to system memory 444 via memory controller 442, and can transfer the video data into the system memory. Additionally, the camera controller is similarly coupled to other resource 448 via controller 446 and can transfer the video data into the other resource.

Image encoder/decoder 418 is also coupled to system memory 444 via memory controller 442, as well as to other resource 448 via controller 446. The image encoder/decoder can convert the data stored in the system memory, or in the other resource, between two or more formats, for example, from digital video (DV) format to motion pictures expert group level 2 (MPEG-2) format, or from those formats to joint motion pictures expert group (JPEG) format.

Transmitter/receiver 420 is also coupled to system memory 444 via memory controller 442, as well as to other resource 448 via controller 446. Among the possible functions of the transmitter/receiver are to receive digital video broadcasts, or to transmit audio to wireless headphones.

Display controller 424 is coupled to display 426, which may be a liquid crystal display (LCD). The display controller provides digital image data or digital video data to display 426. Display controller 424 is also coupled to system memory 444 via memory controller 442, and can transfer the display data from the system memory. Display controller 424 is also coupled to other resource 448 via controller 446, and can transfer the display data from the other resource.

Audio controller 428 is coupled to microphone 430 and speakers 432, and coupled to system memory 444 via memory controller 442. The audio controller transfers audio data between the audio devices and system memory. The audio controller also converts between the digital audio data stored in the system memory and the analog signals of the audio devices.

Multiport memory controller 442 receives access requests from each of requesters 110, resolves any contentions that occur when more than one access request is active at the same time, determines an order in which the access requests are to be performed, and presents one access request at a time to system memory 444. System memory 444 is a random access memory (RAM), in which each access request includes the address or address range within the RAM that is to be read or written.

Similarly, controller 446 receives access requests from each of requesters 110, resolves any contentions that occur when more than one access request is active at the same time, determines an order in which the access requests are to be performed, and presents one access request at a time to other resource 448.

In various embodiments of the invention, the responders may include any functional module within a digital system whose operation includes holding information and responding to requests for access to that information from multiple functional modules within the system. Each responder must contain circuitry in the controller associated with that responder that interprets the transaction ordering constraints provided along with each occurrence of an access request, and that determines a performance order for the access requests that satisfies these constraints. Each responder must also buffer those access requests that are to be performed out of the order in which they are received and those for which a performance order can not be determined until other access requests that may have the same thread ID value have been received.

In various embodiments of the invention, requestors 110 may include any functional module within a digital system whose operation includes making access requests to shared system resources. Some or all of requesters 110 may be able to communicate among each other via interrupts, as well as by passing information back and forth by encoding it as data that is held in system memory 444.

The complexity of the transaction reordering circuitry and the amount of buffering required can be reduced by careful selection of which transaction ordering signals are used, careful selection of the semantics of the transaction ordering signals, limits on the maximum number of access requests that can be held, and limits on the number of bits used to represent thread IDs and sequence numbers within threads.

Figure 5:
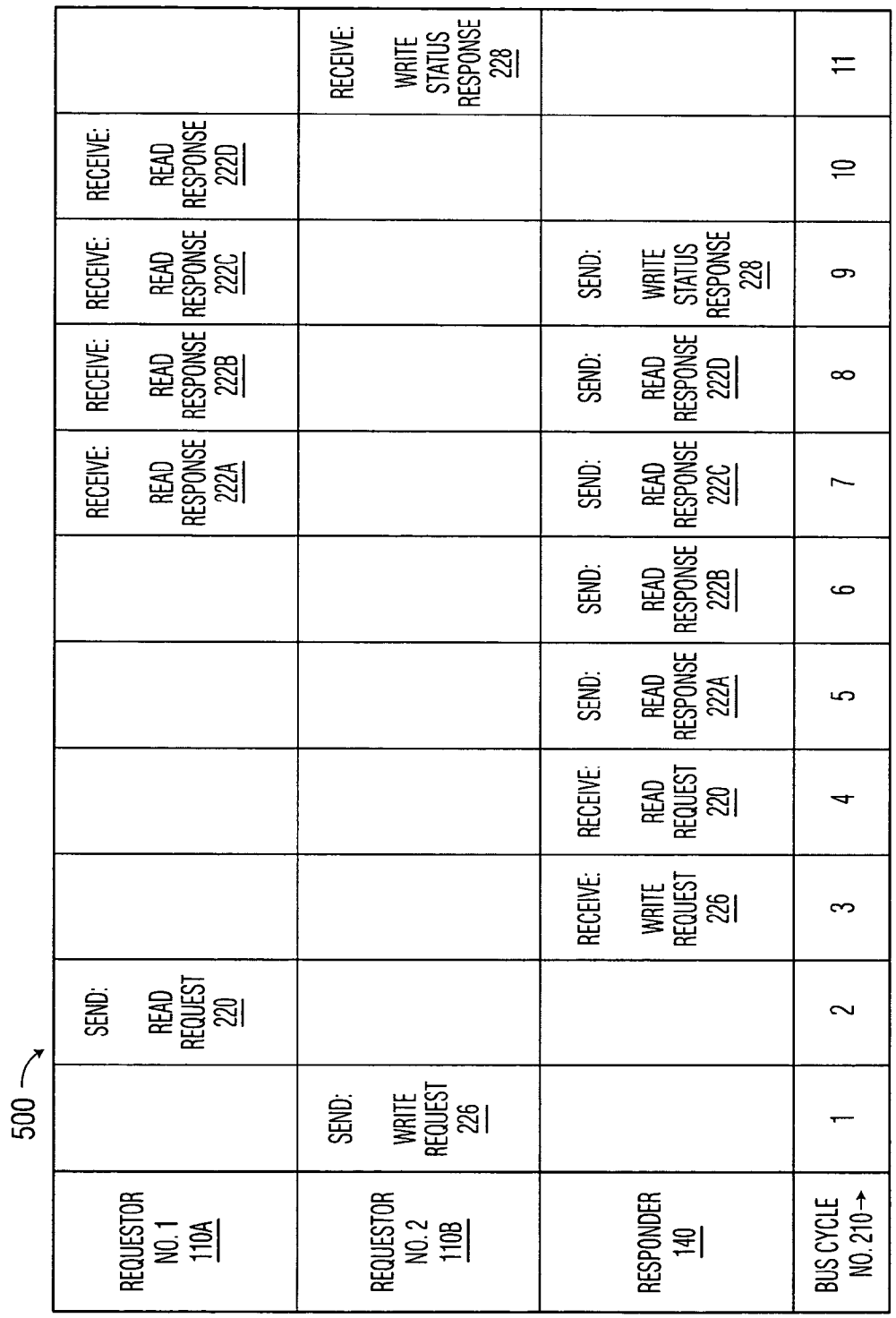
FIG. 5 is an information flow/cycle timing diagram for the same two ordered transactions as shown in FIG. 2, but showing how these transactions occur in the embodiment of the invention shown in FIG. 4.

FIG. 5 illustrates an example of two transactions flowing through a bus network. Like information flow 200 of FIG. 2, information flow 500 of FIG. 5 shows the information that flows into or out of the bus network, for each functional module of the system and for each bus cycle during which either transaction occurs. Except as described below, the design of, alternatives for, and operation of the information flow 500, and of digital system 400 that generates this flow, are as described above with respect to the corresponding elements of FIGS. 2 and 4.

Both information flow 200 and 500 show the same transaction example, that is, a read access followed by a write access in which the read must be completed prior to the write. Unlike information flow diagram 200 which occurs in a system according to the background art, information flow 500 occurs in digital system 400 that includes an embodiment of the invention.

In information flow 500, the transaction example is performed in only 10 bus cycles. In contrast, the background-art system of FIG. 2 requires 16 to 20 bus cycles. This advantageous speedup is obtained because in system 400, the two transactions are ordered by the responders according to the transaction ordering constraints that are indicated by the requesters in the access requests. In digital system 400, the two transactions are performed in the proper order without the requesters generating and receiving a notification from one requester to the other that the first transaction is complete.

Because the requesters in the inventive system need neither generate nor receive such notifications, they are likely to be simpler and require less circuit area than the requestors of the background-art system. The requestors in the digital system 400 must provide ordering information with each access request; however, adding some additional bits of information to the access requests is likely to be considerably simpler than either generating or receiving such notifications. Thus, some embodiments of the invention advantageously simplify the requestors.

In information flow 500, write request 226 is shown as being generated and provided to the bus network in bus cycle 1. However, responder 140 buffers write request 226 and determines a performance order for this transaction example that satisfies the constraint that the read occur before the write. Thus, write request 226 could be generated in a bus cycle earlier than cycle 1 without changing the semantics of the transactions and without delaying the completion of the two transactions.

Thus, the performance of digital system 400 for this transaction example can be summarized by the first row of Table 2, which gives the bus cycles required for bus latencies of two, six and twelve cycles. The second row of Table 2 gives the corresponding bus cycles for digital system 100, as described with respect to FIG. 2 and Table 1.

TABLE 2

| Bus cycles required for transaction example | Bus Latency = 2 | Bus Latency = 6 | Bus Latency = 12 |
|---|---|---|---|
| System 100 | 16 to 26 | 32 to 42 | 56 to 66 |
| System 400 | 11 | 19 | 31 |
| Percentage improvement | 32% to 58% | 40% to 55% | 45% to 63% |

Digital system 400 requires no inter-requestor communication for the example of two transactions; thus, its performance does not depend on the latency of inter-requestor communication. Note that the performance improvement of digital system 400 relative to digital system 100 improves as the bus latency increases.

INDUSTRIAL APPLICABILITY

The invention can be exploited in industry, as will be obvious to one skilled in the art in light of the descriptions contained herein of the invention and of using the invention. The invention can be made using components and manufacturing techniques that are known or described herein. For example, multimedia systems in general are well known and a novel transaction ordering policy is disclosed herein.

The invention solves immediate problems and meets immediate needs that are described herein. For example, bus performance can have a substantial impact on the performance of multimedia systems, to the extent that the quality of the audio or video experienced by the user is noticeably impaired.

The scope of the invention is set forth by the following claims and their legal equivalents. The invention is subject to numerous modifications, variations, selections among alternatives, changes in form, and improvements, in light of the teachings herein, the techniques known to those skilled in the art, and advances in the art yet to be made. The figures and descriptions herein are intended to illustrate the invention by presenting specific details; they are not intended to be exhaustive or to limit the invention to the designs, forms and embodiments disclosed.

What is claimed is:

1. A system for processing information, the system comprising: a memory configured to hold data; at least two processors, each configured to perform operations, and to generate an access request when one of the operations involves access to the data, wherein each access request includes an indication of whether or not this occurrence of the access request is to be performed in a sequential order among other occurrences of the access request and, if so, an indication of a specified order; and a controller configured to receive the access requests from each of the processors, to determine a performance order for the access requests, and to provide the access requests to the memory in the performance order, wherein the performance order conforms to the specified order when the access requests indicate the specified order.

2. The system of claim 1, wherein the memory is selected from a local memory, an embedded memory, an interface to a remote memory, a mum memory, a video memory, a frame buffer memory, a communication buffer, a double data rate (DDR) memory, a random access memory (RAM), a static random access memory (SRAM), or a content addressable memory (CAM).

3. The system of claim 1, wherein each access request further includes an indication of the type of access to the data, the access type being selected from a read access, a write access, a lookup access, or a move access.

4. The system of claim 1, wherein each access request further includes an indication of whether or not the access request is the last access request to which the specified order applies.

5. The system of claim 1, wherein the specified order of a set of access requests corresponds to the order in which the set of access requests is generated.

6. The system of claim 1, wherein each access request further includes a numerical indication of the position of that access request within the specified order.

7. The system of claim 1, wherein each access request further includes an indication of a thread identifier (ID), and the specified order applies only to access requests having corresponding thread IDs.

8. The system of claim 1, wherein: each access request further includes an indication of a thread identifier (ID); a first one of the processors is configured to generate an occurrence of the access request with a specified value for the thread ID; the first processor is further configured to generate an interrupt for a second one of the processors, wherein the interrupt transfers the specified thread ID value to the second processor; the second processor is further configured to generate an occurrence of the access request with the specified thread ID value; and the controller is further configured to compare the thread IDs of each access request, and for a set of access requests having corresponding thread IDs to determine a performance order that conforms to the specified order.

9. A system for processing information, the system comprising: means for accessing data; at least two means for processing series of operations and for generating based thereon access requests for the data, wherein each access request includes an indication of whether or not this occurrence of the access request is to be performed in a sequential order among other occurrences of the access request and, if so, an indication of a specified order; and means for controlling access to the data, for receiving the access requests from each of the processing means, for determining a performance order, and for providing the access requests to the accessing means in the performance order, wherein the performance order conforms to the specified order when the access requests indicate the specified order.

10. The system of claim 9, wherein: each access request further includes an indication of a thread identifier (ID); a first one of the processing means is a means for generating an occurrence of the access request with a specified value for the thread ID, and is further a means for generating an interrupt of a second one of the processing means, wherein the interrupt transfers to the second processing means the specified thread ID value; the second processing means is a means for generating an occurrence of the access request with the specified thread ID value; and the control means is further means for comparing the thread ID values within each of the access requests and, when the thread ID values of a set of access requests correspond, for generating the performance order such that it conforms with the specified order indicated in the access requests.

11. A method of processing information, the method comprising: holding data; performing in parallel at least two series of operations; generating an access request when performing one of the operations when the operation involves accessing the data; including in each access request an indication of whether or not this occurrence of the access request has a specified order among other occurrences of the access request; including an indication of the specified order in those occurrence of the access request that arc ordered; receiving the access requests from each of the series of operations; determining a performance order for the access requests, wherein if the access requests are ordered then the performance order conforms to the specified order; and performing the access requests in the performance order.

12. The method of claim 11, further comprising: including in each occurrence of the access request an indication of the type of access to the data, the access type being selected from reading, writing, looking up, and moving.

13. The method of claim 11, further comprising: including in each access request an indication of whether or not the access request is the last access request to which the specified order applies.

14. The method of claim 11 further comprising: generating a set of access requests is an order that corresponds to the specified order.

15. The method of claim 11, further comprising: including in each access request a numerical indication of the position of that access request within the specified order.

16. The method of claim 11, further comprising: including in each access request an indication of a thread identifier (ID), and the specified order applies only to access requests having corresponding thread IDs.

17. The method of claim 11, further comprising: including in each access request an indication of a thread identifier (ID); generating, based on a first one of the series of operations, a first access request with a specified value for the thread ID; generating, based on the first series of operations, an interrupt for a second one of the series of operations, wherein the interrupt transfers the specified thread ID value to the second series of operations; generating, based on the second series of operations, a second access request with the specified thread ID value; comparing the thread ID values within each of the access requests; and performing a set of access requests in the specified order when the thread ID values of the set of access requests match.

* * * * *